US007242665B2

(12) United States Patent
Langille et al.

(10) Patent No.: US 7,242,665 B2
(45) Date of Patent: Jul. 10, 2007

(54) NETWORK DEVICE VIRTUAL INTERFACE

(75) Inventors: Paul F. Langille, Temple, NH (US);
Gregory S. Lauer, Sudbury, MA (US);
Joseph A. Laria, Wilmington, MA (US)

(73) Assignee: Ericsson AB, Stockholm (SE)

( * ) Notice: Subject to any disclaimer, the term of this patent is extended or adjusted under 35 U.S.C. 154(b) by 876 days.

(21) Appl. No.: 10/033,147

(22) Filed: Oct. 19, 2001

(65) Prior Publication Data
US 2002/0097730 A1 Jul. 25, 2002

Related U.S. Application Data

(60) Provisional application No. 60/264,088, filed on Jan. 25, 2001.

(51) Int. Cl.
*H04L 12/56* (2006.01)
(52) U.S. Cl. .................. 370/217; 370/392; 370/395.52
(58) Field of Classification Search ........ 370/351–354, 370/225–228, 401, 419, 420, 463, 469, 395.5, 370/390, 396–399, 474, 475, 356
See application file for complete search history.

(56) References Cited

U.S. PATENT DOCUMENTS

| 5,586,261 | A | | 12/1996 | Brooks et al. ......... 395/200.02 |
|---|---|---|---|---|
| 5,987,526 | A | | 11/1999 | Morales ...................... 709/249 |
| 6,049,829 | A | * | 4/2000 | Li .............................. 709/229 |
| 6,160,651 | A | | 12/2000 | Chang et al. ............... 359/124 |
| 6,205,488 | B1 | | 3/2001 | Casey et al. ................ 709/238 |
| 6,286,047 | B1 | * | 9/2001 | Ramanathan et al. ....... 709/224 |
| 6,501,758 | B1 | * | 12/2002 | Chen et al. .............. 370/395.1 |
| 6,665,301 | B1 | * | 12/2003 | Wu ........................ 370/395.41 |
| 2002/0037012 | A1 | * | 3/2002 | Sullivan et al. ............. 370/419 |
| 2002/0118644 | A1 | * | 8/2002 | Moir ........................ 370/230.1 |
| 2002/0120720 | A1 | * | 8/2002 | Moir .......................... 709/220 |
| 2004/0120322 | A1 | * | 6/2004 | Wu ......................... 370/395.4 |

OTHER PUBLICATIONS

Cisco MPLS Controller Software Configuration Guide, Release 9.3.0 , Apr. 2000, pp. 2.27-2.29.*
Cisco MPLS Controller Software Configuration Guide, Release 9.3.0 , Apr. 2000.*

(Continued)

*Primary Examiner*—Hassan Kizou
*Assistant Examiner*—Salman Ahmed
(74) *Attorney, Agent, or Firm*—Ansel M. Schwartz

(57) ABSTRACT

A network device includes a virtual router subsystem having potentially numerous virtual routers associated with corresponding different virtual private routed networks (VPRN) and employing generic interface identifiers to identify interfaces at which VPRN traffic is received or transmitted. A virtual interface subsystem couples the virtual router subsystem to physical interfaces of the device. The virtual interface subsystem includes virtual interfaces organized into linked sets, and each set associates a generic identifier of a virtual router with a physical interface to another network device serving the same VPRN. A basic type of set includes two VIs for interfacing a virtual router to a customer access link, and a more complicated set includes multiple pairs of several types of VIs to interface a virtual router to redundant label-switched paths on a channel-oriented backbone link such as an ATM link.

18 Claims, 9 Drawing Sheets

OTHER PUBLICATIONS

International Engineering Consortium, Online Education, "MPLS and Its Components", http://www.iec.org/online/tutorials/mpls/topic03.html, (2001).

International Engineering Consortium, Online Education, "MPLS Operation", http://www.iec.org/online/tutorials/mpls/topic04.html, (2001).

International Engineering Consortium, Online Education, "MPLS Protocol Stack Architecture" http://www.iec.org/online/tutorials/mpls/topic05.html, (2001).

Cisco Systems Inc., "Resource Reservation Protocol (RSVP)" http://www.cisco.com/univered/cc/td/doc/cisintwk/ito_doc/rsvp.htm (1989-1999).

* cited by examiner

NETWORK DEVICE VIRTUAL INTERFACE

CROSS REFERENCE TO RELATED APPLICATIONS

This application claims priority under 35 U.S.C. §119(e) of U.S. Provisional Patent Application No. 60/264,088 filed Jan. 25, 2001.

STATEMENT REGARDING FEDERALLY SPONSORED RESEARCH OR DEVELOPMENT

Not Applicable

BACKGROUND OF THE INVENTION

The present invention is related to the field of routed networks, and more particularly to routed networks employing virtual private routed network (VPRN) techniques.

One of the challenges facing designers of data communications networks is to provide improved performance in the face of tremendous growth in network size and complexity. As the number of nodes using distinct network addresses in a network grows, the sizes of routing tables used for routing in the network increase, and more processing power is required to calculate routes and carry out the routing of network traffic. In fact, the processing load associated with routing increases generally as the square of the number of distinct routes. In large networks having a generally flat shared address space, such as the Internet, it may be infeasible for routers to support sufficiently large routing tables, due to constraints in the available processing power.

It has been known to emulate a private, wide-area routed network within another, generally more public, wide-area network. Such an emulated network is referred to as a virtual private routed network (VPRN). Because a VPRN "piggybacks" on a separate and generally shared network, it can be more cost effective than a distinct, dedicated private wide area network. At the same time, there is significant functional separation between the VPRN and the underlying network, so that VPRN largely behaves like a standalone network, with attendant benefits in security, network management, and other aspects of network operation.

In a common VPRN configuration, the VPRN employs Internet Protocol (IP) technology of the same type used in the Internet, complete with a private instance of a distributed IP routing protocol such as Open Shortest Path First (OSPF) and a private set of network addresses such as IPv4 addresses. A mesh of "tunnels", or dedicated virtual channels, are established among a set of private router nodes in the Internet. The router nodes encapsulate VPRN traffic in a format required by the tunnels, transmit encapsulated traffic to other router nodes using the Internet address space and routing protocols, decapsulate received traffic to recover the original VPRN traffic, and then use the VPRN routing protocols and address space to forward the traffic to other nodes in the VPRN outside the Internet.

As with conventional routers, routers supporting VPRNs contain a large amount of information about physical details of the network. This information takes the form, for example, of physical port identifiers, layer-2 addresses, etc. It can be difficult to correctly maintain this information in routers. This is especially true of routers supporting VPRNs, because of the greater degree of replication of the information across all active VPRNs. When physical changes to the network are made that might result in the creation of new routes, the deletion of old routes, or the switching of one route for another, it is necessary to update all the relevant information for all the VPRNs in all routers. Such a task becomes increasingly difficult as the size and complexity of networks increase, resulting in sub-optimal network size, performance, or both.

BRIEF SUMMARY OF THE INVENTION

In accordance with the present invention, a network device is disclosed that employs a collection of virtual interfaces between a virtual router subsystem and physical interfaces of the device. Physical network information is concentrated in the virtual interfaces, so that changes in the physical network can be easily reflected in the network device without requiring re-programming or re-configuring the virtual routers themselves.

The disclosed network device includes a virtual router subsystem having a number of virtual routers, each virtual router being associated with a corresponding different virtual private routed network (VPRN) and each employing generic interface identifiers to identify interfaces at which routing traffic for the VPRNs is received and transmitted. Also included are a number of physical interfaces to physical network links connecting the network device to other network devices. A virtual interface subsystem couples the virtual router subsystem to the physical interfaces. The virtual interface subsystem includes a number of virtual interfaces of multiple types. The virtual interfaces are organized into linked sets, each set generally including virtual interfaces of different types and being operative to associate a generic identifier used by a given virtual router with a corresponding physical interface to another network device serving the same VPRN.

The virtual interface represents the connection between virtual routers and the interface's physical, logical link, and IP layers. In the virtual interface there is an association between commonly shared resources. This simplifies interface management by providing a mechanism to manage interface connections to virtual routers instead individually managing the configuration interface elements.

The virtual interface is an organized collection of component objects. Each component object could represent an interface element in an interface object model (e.g., a physical port, physical link, a logical link, a protocol instance, etc.). The objects can be linked or layered together in a manner to form an association that defines a traditional interface (e.g., a VLAN, an ATM PVC running NRT-VBR, or an MPLS label stack). In effect, virtual interface allows the configuration of any port with any protocol to any virtual router at any time.

The virtual interface provides a generic programming framework between the packet forwarding instances of virtual router in the hardware and the configuration information in the management control software. The purpose of that framework is to encapsulate interface information required for packet transport and packet classification. In addition the virtual interface provide a mechanism for link layer backup and load balancing.

The virtual interface subsystem is highly configurable, enabling the definition of many different types of sets of linked VIs to achieve different operational goals. A basic set contains only two VIs for interfacing a virtual router to a customer access link, whereas a significantly more complicated set includes multiple pairs of several types of VIs to interface a virtual router to redundant label-switched paths on a channel-oriented backbone link such as an ATM link.

The use of the virtual interface subsystem provides for desirable decoupling of virtual router operation from the details of the physical channels used for routed traffic in the network.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

The disclosure of U.S. Provisional Patent Application No. 60/264,088 filed Jan. 25, 2001, is hereby incorporated by reference herein.

Figure 1:
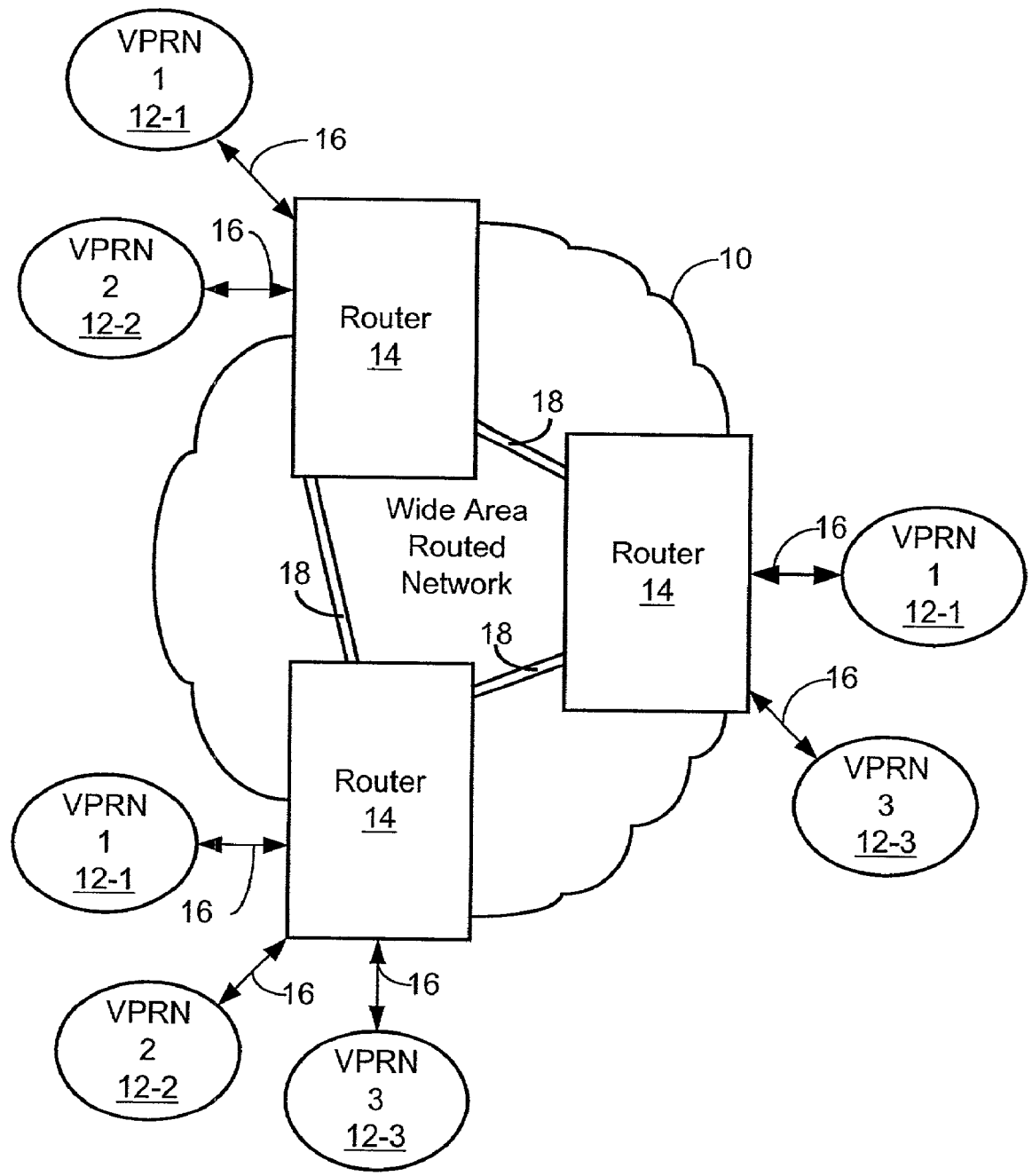
FIG. 1 is a block diagram of a network including routers employing virtual interfaces in accordance with the present invention.

FIG. 1 shows a network in which a wide-area routed network 10 is utilized to carry traffic for a number of virtual private routed networks (VPRNs). Each VPRN includes corresponding VPRN subnetworks 12. In FIG. 1, VPRNs numbered 1 through 3 are shown, with each including corresponding subnetworks 12-1, 12-2 and 12-3. The wide-area routed network 10 includes a number of routers 14. Each router 14 has connections to access links 16 that connect the router 14 to local VPRN subnetworks 12, and has connections to backbone links 18 that connect the router 14 to other routers 14 in the wide-area routed network 10.

An example of the wide-area routed network 10 is a global network such as the Internet. In general, the wide-area routed network 10 has a given network address space and a defined set of communications protocols, including routing protocols. For example, the wide-area routed network 10 may employ the Internet Protocol (IP) with IP version 4 (IPv4) addressing, and employ routing protocols such as Border Gateway Protocol (BGP), Open Shortest Path First (OSPF), Routing Information Protocol (RIP), etc.

Each VPRN, which is made up of a corresponding set of VPRN subnetworks 12, is a routed network having its own network address space and network communications protocols, including a routing protocol. Nodes within a VPRN are generally not assigned addresses in the address space of the wide-area routed network 10, nor do the routers 14 carry traffic on their specific behalf. Rather, as described in more detail below, the routers 14 utilize the address space and routing protocols of the wide-area routed network 10 on behalf of the VPRN subnetworks 12 as entities. The VPRN subnetworks 12, in turn, utilize their respective private address spaces and routing protocols for internal routing of data traffic among specific computers or other types of network sources and destinations. Fundamentally, the wide-area routed network 10 and routers 14 serve to provide dedicated virtual connections among the VPRN subnetworks 12 to form the various larger-scale VPRNs.

Figure 2:
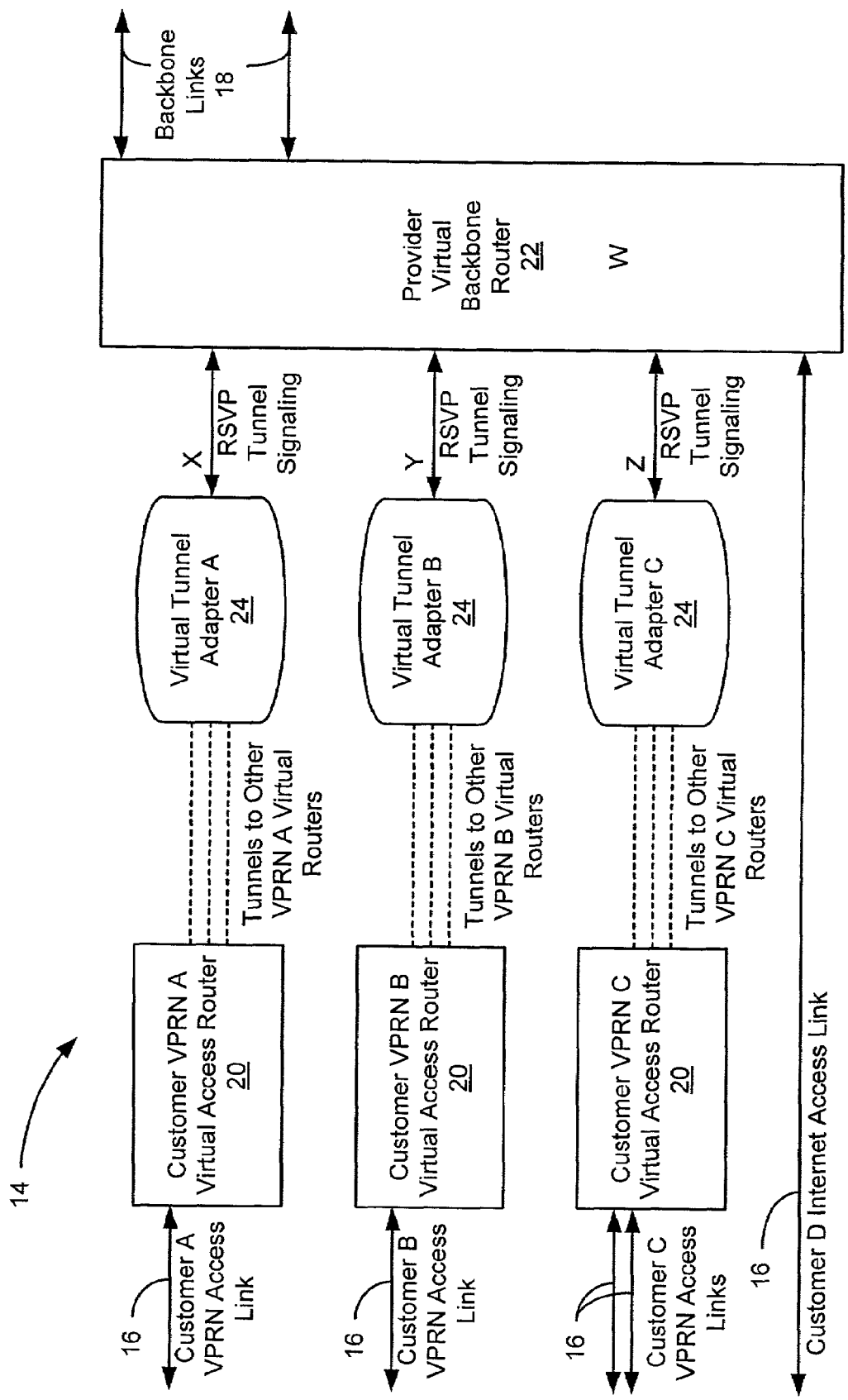
FIG. 2 is a high-level functional block diagram of a router in the network of FIG. 1.

FIG. 2 shows an exemplary organization of a router 14. Several "virtual access routers" (VARs) 20 are associated with respective customers and connected to the respective customers' access links 16. These are described in more detail below. A provider "virtual backbone router" (VBR) 22 is connected to the backbone links 18 of the wide area routed network 10 of FIG. 1. The VBR 22 uses IP addresses from the address space of the wide area routed network 10, which is separate from the address spaces of the VPRNs. The VBR 22 provides a tunneling service to VARs 20 that is used in constructing the VPRNs. A signaling protocol such as the Resource Reservation Protocol (RSVP) is used to set up the tunnels. The VBR 22 may also provide direct access to the wide area routed network 10 for customers desiring such service, such as Customer D in FIG. 2. The VBR 22 participates in the full routing for the wide-area routed network 10. In the case of the Internet, the VBR 22 generally maintains a full BGP routing table.

Each VAR 20 has its own routing table and runs its own instances of the routing protocols used in the corresponding VPRN. The network addresses (e.g., IP addresses) of a VAR 20 are taken from the address space of the VPRN to which the VAR belongs. Different VARs 20 can use overlapping sets of addresses, i.e., the same address may appear in different sets, even though the different instances of the address belong to different nodes in different VPRNs. There is generally no direct connection, in the sense of an IP routing adjacency, between different VARs 20 within a router 14 or between a VAR 20 and the VBR 22.

As mentioned, RSVP signaling is used to create tunnels within the wide-area routed network 10 to connect VARs 20 residing in different routers 14. This signaling is accomplished through the use of virtual tunnel adapters (VTAs) 24. These devices resemble IP hosts residing in the wide-area routed network 10. Each VTA 24 has a signaling interface via which the VTA 24 is instructed to establish a tunnel connection between a local VAR 20 and a remote VAR 20 residing on another router 14 (not shown in FIG. 2).

Figure 3:
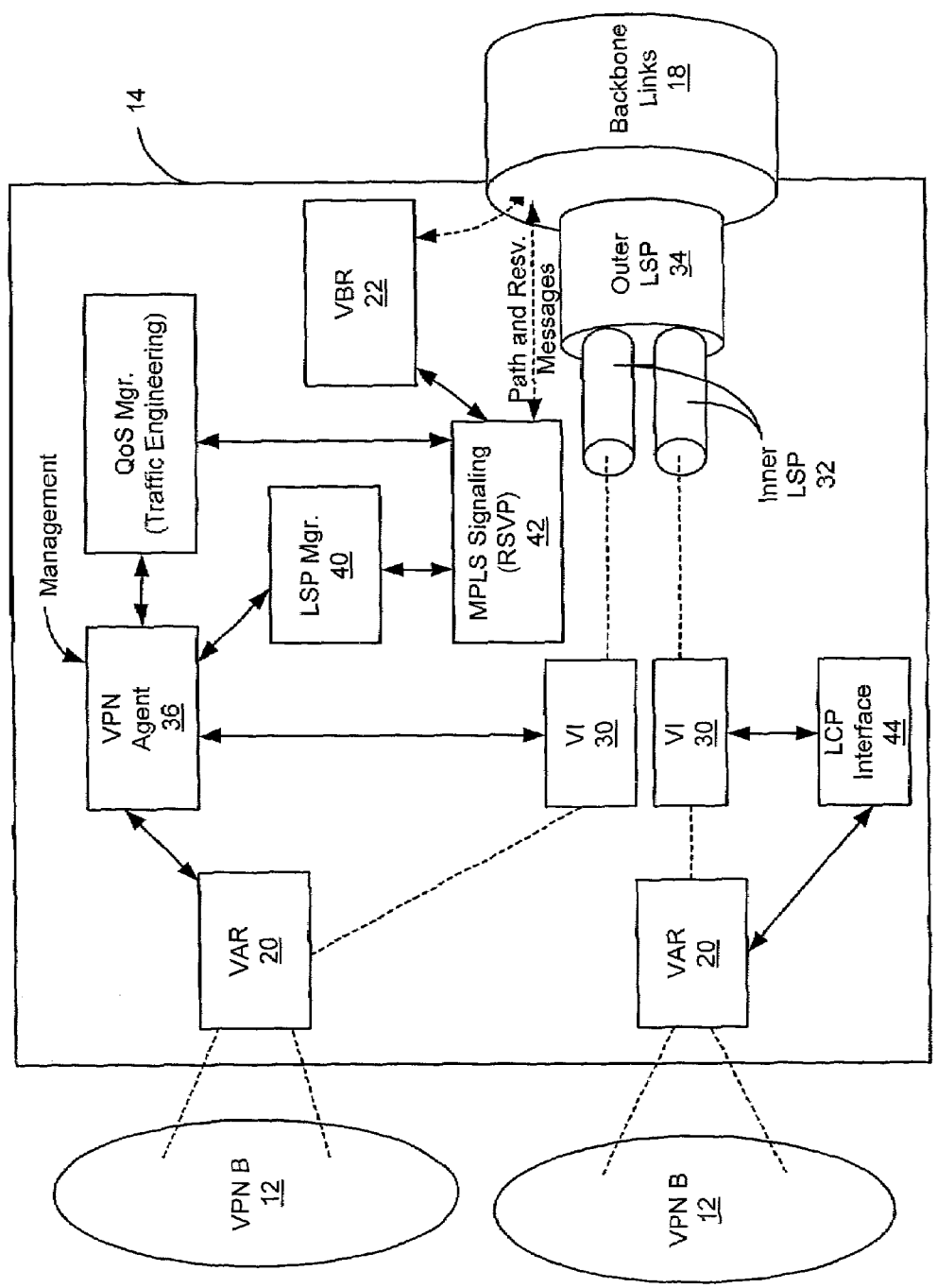
FIG. 3 is a more detailed functional block diagram of the router of FIG. 2.

FIG. 3 shows a more detailed view of a router 14. The VARs 20 are associated with Virtual Interfaces (VIs) 30, which in turn are associated with MPLS label switched paths (LSPs) on the backbone links 18 of the wide area routed network 10. LSPs are established to form the tunnels through the wide area routed network 10 that link the various VPRN subnetworks 12. As shown, a two-level hierarchy of LSPs is used. An "inner" LSP 32 carries traffic specifically associated with a given VI 30. An "outer" LSP 34 carries a group of inner LSPs 32. A different outer LSP 34 is defined between each pair of routers 14 in the wide-area routed network 10.

The router 14 also includes various additional functional entities such as a VPN Agent 36, Quality of Service (QoS) Manager 38, LSP Manager 40, MPLS Signaling function 42, and Line Control Processor (LCP) Interface 44. The VPN Agent 36 coordinates the configuration of the VPRNs. The VPN Agent 36 instantiates VARs 20 and VIs 30, interacts with the LSP Manager 40 to coordinate the use of labels, and passes QoS information to the LSP manager 40 for dynamically configured labels. The QoS Manager 38 handles the QoS aspect of the setting up of LSPs, which includes interpreting the QoS parameters of RSVP.

The LSP Manager 40 coordinates all aspects of LSPs, including the creation and deletion of LSPs and the maintenance of label information. It interfaces with the VPN agent 36 and the MPLS signaling function 42 in the creation, monitoring, and deletion of LSPs.

The MPLS signaling function 42 implements RSVP signaling for MPLS. At an ingress node for an LSP, the MPLS signaling function 42 signals downstream to obtain a label. At an egress node, the MPLS signaling function 42 passes labels upstream. At a transit node, the MPLS signaling function 42 interfaces with upstream and downstream routers to distribute labels.

The MPLS signaling function 42 also interfaces with routing code to obtain next hop information, and passes label information to the LSP Manager 40.

The LCP interface 44 passes forwarding information from the software-implemented functions of FIG. 3, such as the VARs 20 and VIs 30, to hardware forwarding engines residing on line cards (not shown) within the router 14. The forwarding information falls into four categories: next hop routing information, MPLS label information, packet classification information, and QoS information.

Figure 4:
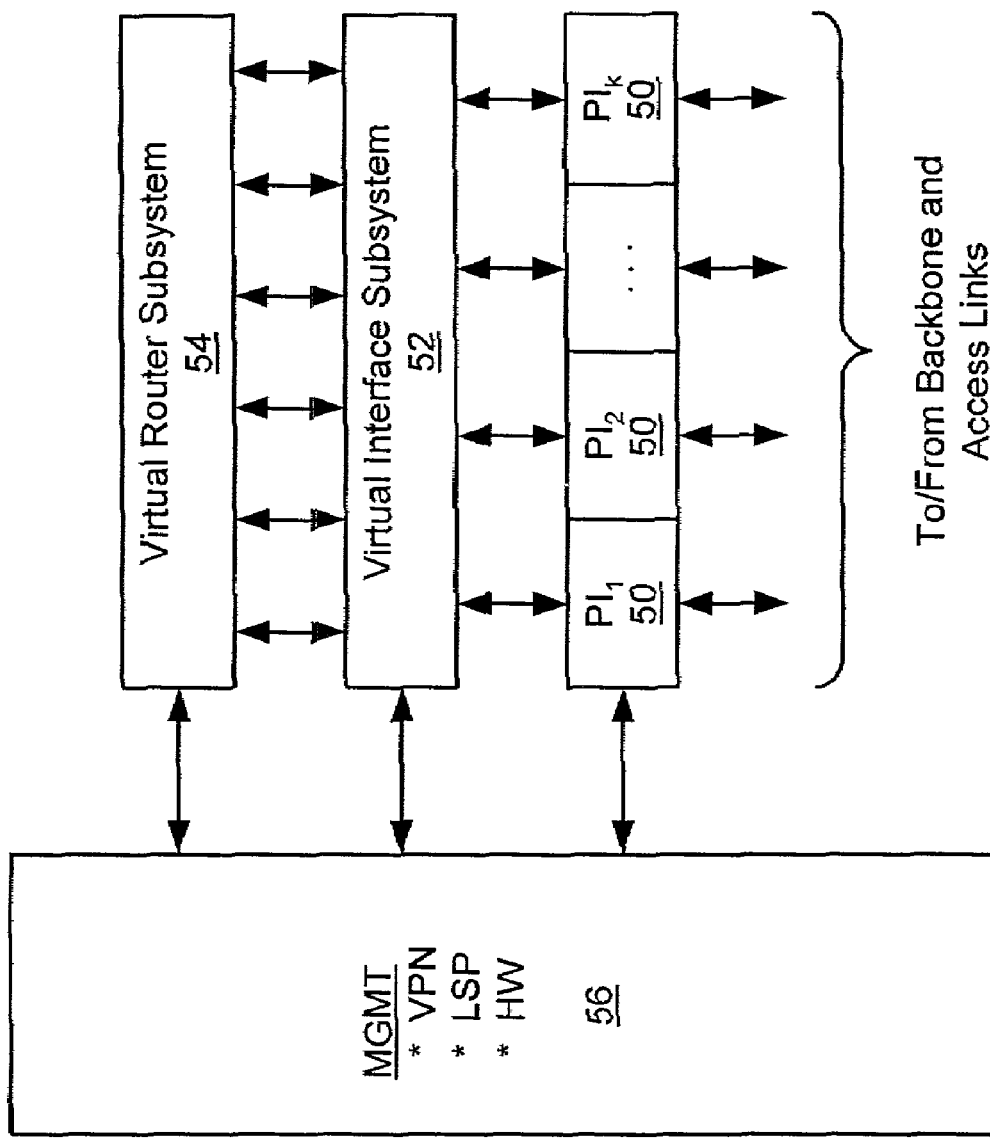
FIG. 4 is a high-level block diagram depicting the hardware/software architecture of the router of FIGS. 2 and 3.

FIG. 4 shows a high-level software and hardware organization for the routers 14. A number of physical interfaces (PIs) 50 connect to the access links 16 and backbone links 18 of FIGS. 1-3. Examples of such interfaces include Ethernet interfaces, SONET interfaces, etc. A layer-2 protocol such as ATM may also be used. Each PI 50 is also connected to a virtual interface (VI) subsystem 52, which includes all of the VIs in the router 14, such as the VIs 30 of FIG. 3. The VI subsystem 52 has a number of connections to a virtual router (VR) subsystem 54, which includes all the virtual routers such as the VARs 20 and VBR 22 of FIG. 3. The PIs 50, VI subsystem 52, and VR subsystem 54 are coupled to a collection of other functional elements labeled in FIG. 4 as a management subsystem 56. The management subsystem 56 includes the VPN agent 36, QoS Manager 38, LSP Manager 40, MPLS Signaling function 42 and LCP interface 44 of FIG. 3.

The virtual routers (VRs) within the VR subsystem 54 generally consist of processes and associated data that behave as a number of separate, distinct routers. Each VR is associated with a different VPRN. A given router 14 may include a few or many such VRs in accordance with the number of VPRNs having traffic flowing through the router 14. Subject to hardware constraints of a given platform, such as processing power and memory capacity, a router 14 may be configured with as many as hundreds or potentially thousands of such VRs.

The VI subsystem 52 provides a special function within the router 14. A conventional router generally includes a routing subsystem tied directly to physical interfaces, without an intermediate subsystem such as the VI subsystem 52 shown in FIG. 4. Accordingly, changes to the underlying physical network result in the need to change routing tables and other data structures in the routing subsystem. Examples of such changes to the physical network include manual reconfigurations and automatic protection switching. When the routing subsystem has a very large routing data structure, as is the case for the VR subsystem 54, it is difficult and inefficient to maintain physical-layer information within it. The arrangement of FIG. 4 addresses these problems by "virtualizing" the interfaces from the perspective of the virtual routers in the VR subsystem 54. Each virtual router employs static, generic interface identifiers, and the VI subsystem 52 handles the translation between these interface identifiers and details of underlying physical interfaces, which in general are subject to dynamic change.

Figure 5:
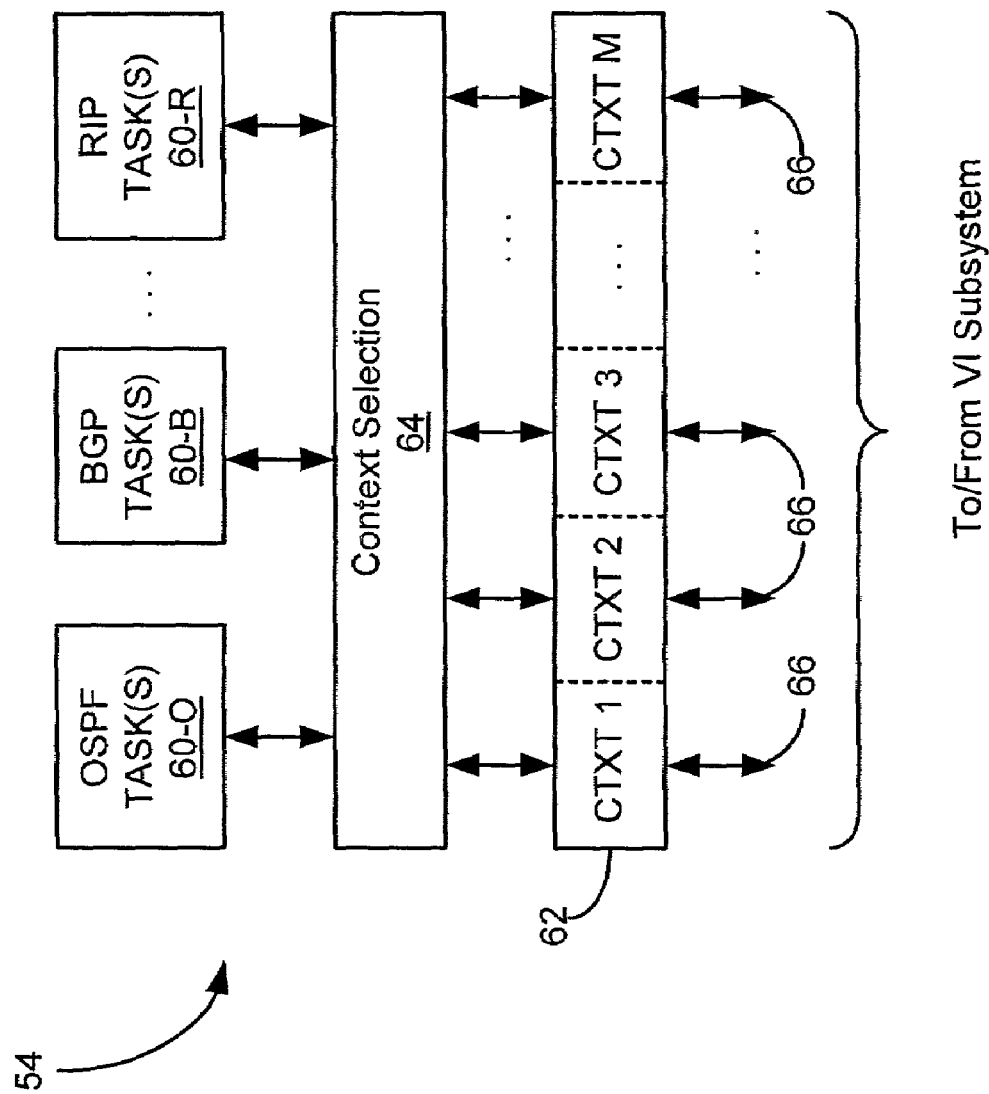
FIG. 5 is a block diagram of a virtual router subsystem in the router of FIGS. 2-4.

FIG. 5 shows the VR subsystem 54. A collection of routing processes or tasks such as OSPF tasks 60-O, BGP tasks 60-B, and RIP tasks 60-R are coupled to a memory 62 via context selection logic 64. The memory 62 is divided into a number of context areas, shown as CTXT 1, CTXT 2, . . . CTXT M, for M distinct VRs. Each context area contains a routing table and other operating state information for a different VR. The tasks 60 are independent processes that are time-shared among the various VRs. The time-sharing is accomplished in part via the context selection logic 64. As events occur that require action for a given VR (most such events being associated with the sending and receiving of routing protocol messages or packets), the context selection logic 64 couples the appropriate task 60 to the context area CTXT for that VR. The task 60 then executes using the data from that context area CTXT. This processing continues to completion before a subsequent event is permitted to activate another VR, at which time the same or a different task 60 becomes coupled to a context area CTXT for the other VR.

As an example, let it be assumed that a VR identified as VR #134 is part of a VPRN in which the OSPF routing protocol is used. Context area CTXT 134 of the memory 62 contains the routing table and other operating state for this VR. Upon receipt of a routing protocol packet on a VI associated with VR #134, an OSPF task 60-0 is activated, and the context selection logic 64 connects the OSPF task 60-O to context area CTXT 134. The OSPF task 60-O performs operations in accordance with the received packet, which may include updating the routing table and initiating the transmission of one or more routing protocol packets to other routers in the VPRN. Once the processing associated with the received routing protocol packet is complete, the context selection logic 64 is free to break the connection between the OSPF task 60 and context area CTXT 134 in favor of a new connection, which will generally involve a different context area CTXT of the memory 62 and may involve a different task 60 as well.

In the illustrated embodiment, the context selection logic 64 employs an inner-LSP label appearing in encapsulated protocol packets to identify which context area 62 to select for processing the packet. A mapping table (not shown) within the context selection logic 64 maps the label to a base address of the associated context area 62. The inner-LSP label appearing in the encapsulated protocol packets is likewise mapped to the generic interface identifiers used in the routing table that resides in the selected context area 62.

The number of tasks 60 can vary in accordance with the routing protocols being used by the active VPRNs and the processing resources available in the router 14. There must be at least one active task 60 for each different routing protocol used by any of the VPRNs supported by the router 14. Thus, if all of the active VPRNs are using either OSPF or BGP routing, for example, then the minimum set of tasks 60 is one OSPF task 60-O and one BGP task 60-B. In general, one task 60 can support a number of VPRNs of the same type (i.e., using the same routing protocol), depending on the processing resources allocated to the task 60 and the demand from the VPRNs. If there are a large number of active VPRNs using a given protocol, it may be desirable that there be multiple tasks 60 of the same type. These tasks may time-share the same physical processor(s), or may be distributed in a parallel fashion among different processors if such hardware processing resources are available in the router 14.

Similarly, the memory 62 may be a single memory containing all the context areas CTXT for all VRs of the router 14, or it may be a system having multiple independent memories, each containing some subset of the context areas CTXT. The context selection logic 64 is generally designed to exploit parallelism in order to maximize performance. If the hardware platform is capable of running multiple tasks 60 simultaneously and accessing multiple context areas CTXT of the memory 62 simultaneously, then preferably the context selection logic 64 looks for opportunities to activate two or more VRs simultaneously.

The connections 66 shown in FIG. 5 represent logical connections between each VR and the VI subsystem 52 of FIG. 4. In general, there are multiple such logical connections between each VR and the VI subsystem 52, with each logical connection corresponding to a different interface identifier. Some VRs may have as few as two associated VIs, whereas other VRs may have many.

Figure 6:
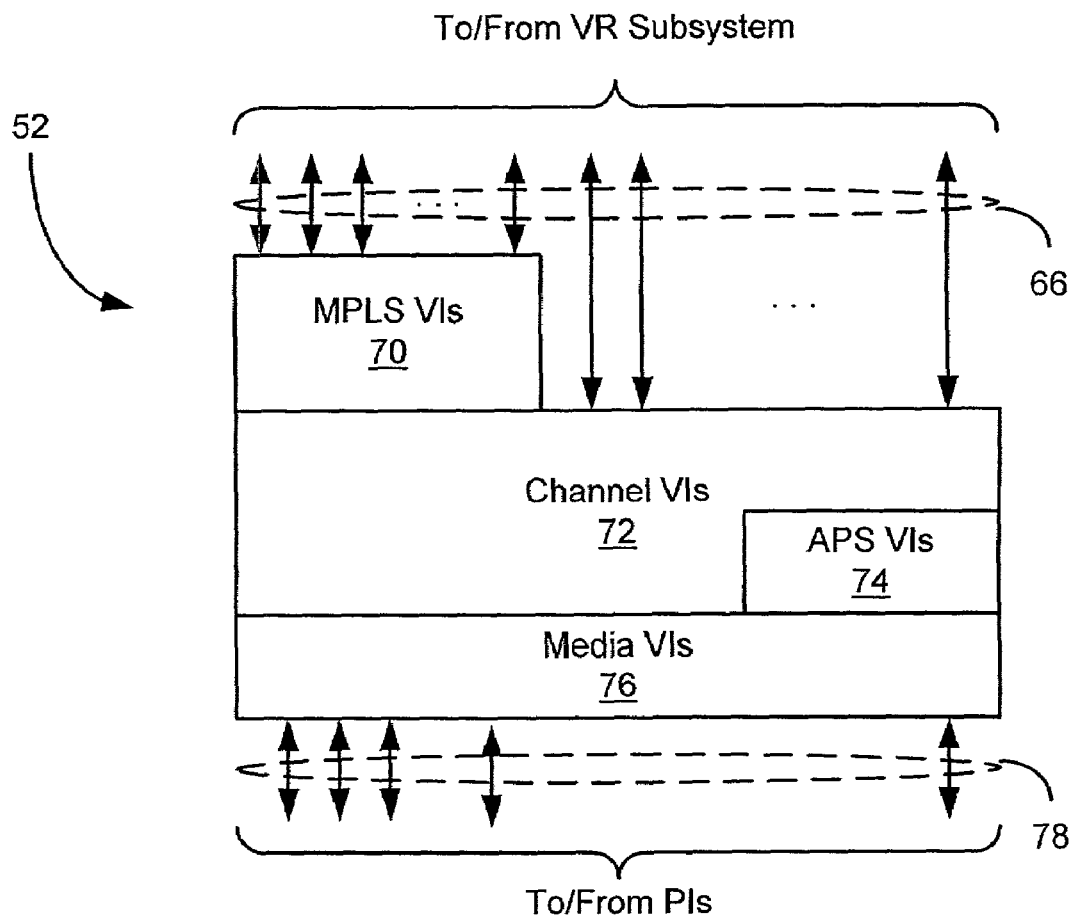
FIG. 6 is a block diagram of a virtual interface subsystem in the router of FIGS. 2-4.

FIG. 6 shows the VI subsystem 52. As previously indicated, the VIs implement a translation between the VRs and the PIs 50 of FIG. 4. As shown in FIG. 6, this translation is generally multi-layered. A number of MPLS VIs 70 interface to VRs in the VR subsystem 54. The MPLS VIs define label-switched paths (LSPs) that serve as VPRN-specific tunnels in the wide-area routed network 10. Channel VIs 72 define abstract channels, some of which are associated with the MPLS VIs and others associated directly with VRs in the VR subsystem 54. A subset of the channel VIs 72 are associated with automatic protection switching (APS) VIs 74. The channel VIs 72 and APS VIs 74 are further associated with media VIs 76, which in turn are associated with corresponding PIs 50 of FIG. 4 via combined logical/physical connections 78. Each of these classes of VIs is described in turn below.

A connection between a given PI 50 of FIG. 4 and a given VR is made through a linked set of VIs in the VI subsystem 52. Such a set generally includes at least one media VI 76 and one channel VI 72, and may include an MPLS VI 70 or an APS VI 74 as well. Outbound messages generated by a VR that appear on a given connection 66 are processed within the VI subsystem 52 in accordance with information from the associated MPLS VI 70 (if any), channel VI 72, APS VI 74 (if any), and media VI 76. Similarly, inbound messages received from the PIs 50 at the connections 78 are processed in accordance with corresponding sets of VIs. The VI subsystem 52 forms a database having a potentially large number of such connected sets of VIs.

Figure 7:
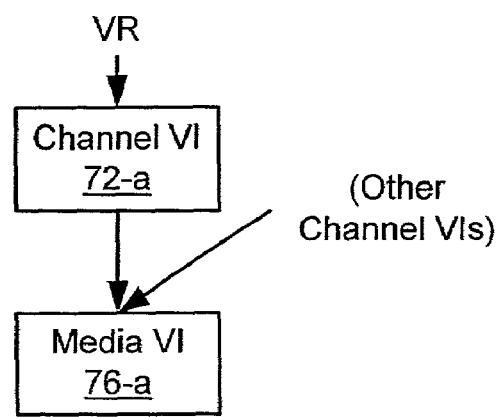
FIG. 7-11 are diagrams showing exemplary sets of virtual interfaces in the virtual interface subsystem of FIG. 6.

FIG. 7 shows a first example of a set of linked VIs in the VI subsystem 52. This set is used to form a transmit interface for a VR on an access link 16. The interface identifier within the VR points to a channel VI 72-*a*, which in turn points to a media VI 76-*a*. As indicated, the media VI 76-*a* is generally shared with other channel VIs (not shown). The channel VI 72-*a* contains information about the individual channel, such as the type of channel (VLAN, MPLS, etc.), the channelization value (e.g. VLAN tag), and channel resources (bandwidth). The Media VI 76-*a* contains information about the physical interfaces, such as interface type, encapsulation type, etc.

Figure 8:
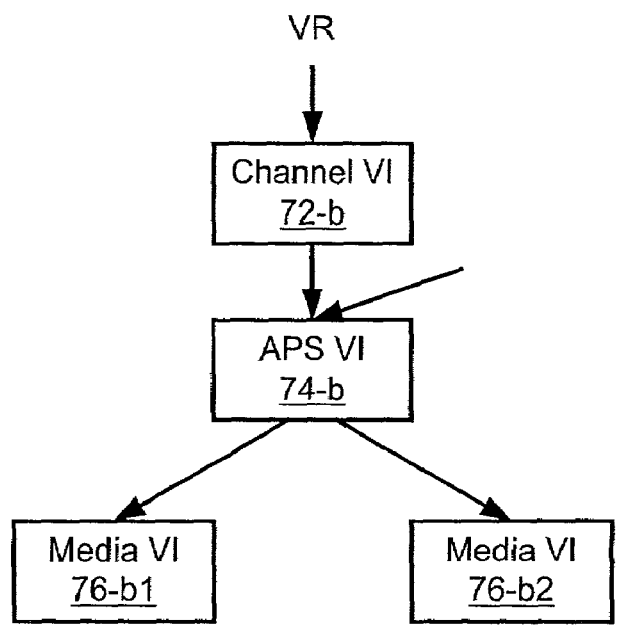

FIG. 8 shows an example set of linked VIs for a backbone link 18. Here, a channel VI 72-*b* is associated with an APS VI 74-*b*, which in turn is associated with two media VIs 76-*b*1 and 76-*b*2. The APS VI 76-*b* contains information indicating which media VI 76-*b*1 or 76-*b*2 is the "working" instance and which is the "protect" instance, and further includes state information for each media VI such as "active", "standby", "operative", "inoperative", etc.

Figure 9:
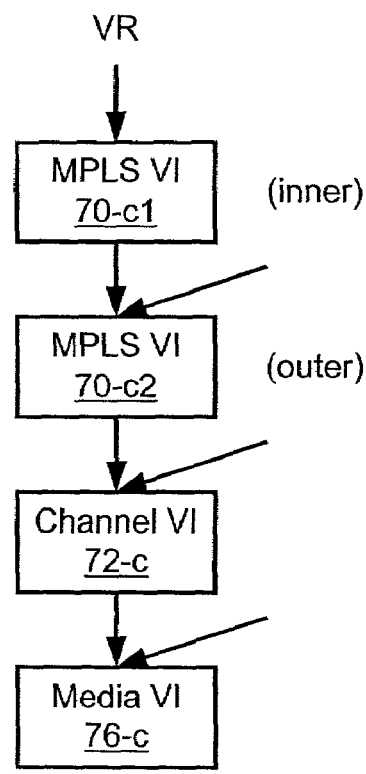

FIG. 9 shows an example of a linked set of VIs forming the interface within one VAR 20 via which another VAR 20 of the same VPRN is reached through the wide-area routed network 10. A first MPLS VI 70-*c*1 contains the label and other information for an inner LSP, and a second MPLS VI 70-*c*2 contains the label and other information for an outer LSP. Because there are typically multiple inner LSPs for each outer LSP, the outer MPLS VI 70-*c*2 is generally shared with other inner MPLS VIs like MPLS VI 70-*c*1. The outer MPLS VI 70-*c*2 points to a channel VI 72-*c*, which in turn points to a media VI 76-*c*. These MPLS VIs include MPLS path information along with resource and policy information (e.g., set-up priority, hold priority).

Figure 10:
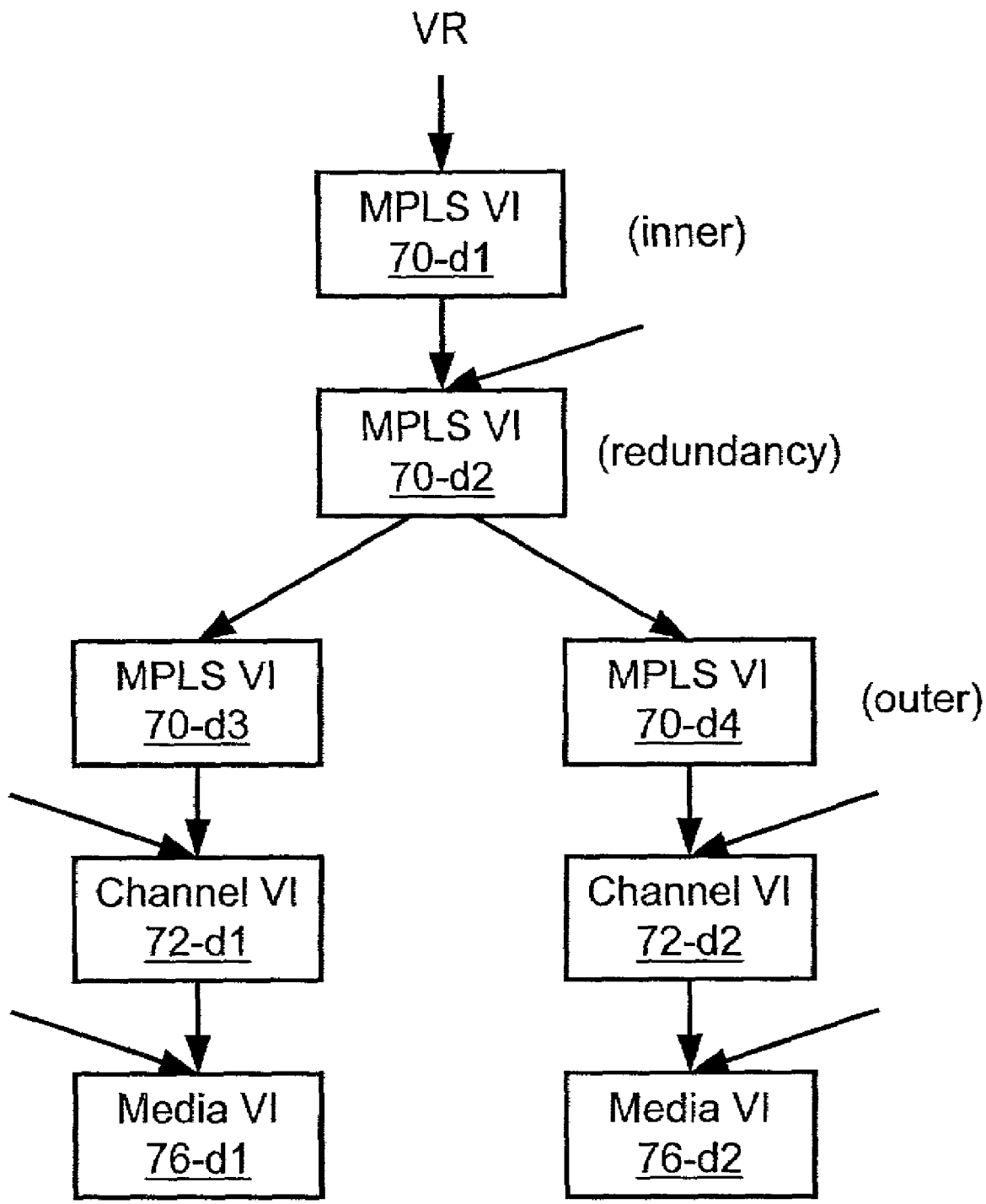

FIG. 10 shows an example of a set of VIs used when MPLS redundancy is employed. An inner MPLS VI 70-*d*1 points to a "redundancy" MPLS VI 70-*d*2. The redundancy MPLS VI 70-*d*2 is similar to the APS VI 74-*b* of FIG. 8, in that it contains information identifying working and protect paths and associated state information. In contrast to APS, however, each packet is sent over only one of a redundant pair of MPLS paths. The redundancy MPLS VI 70-*d*2 points to two outer MPLS VIs 70-*d*3 and 70-*d*4. These in turn point to respective channel VIs 72-*d*1 and 72-*d*2, which point to respective media VIs 76-*d*1 and 76-*d*2.

Figure 11:
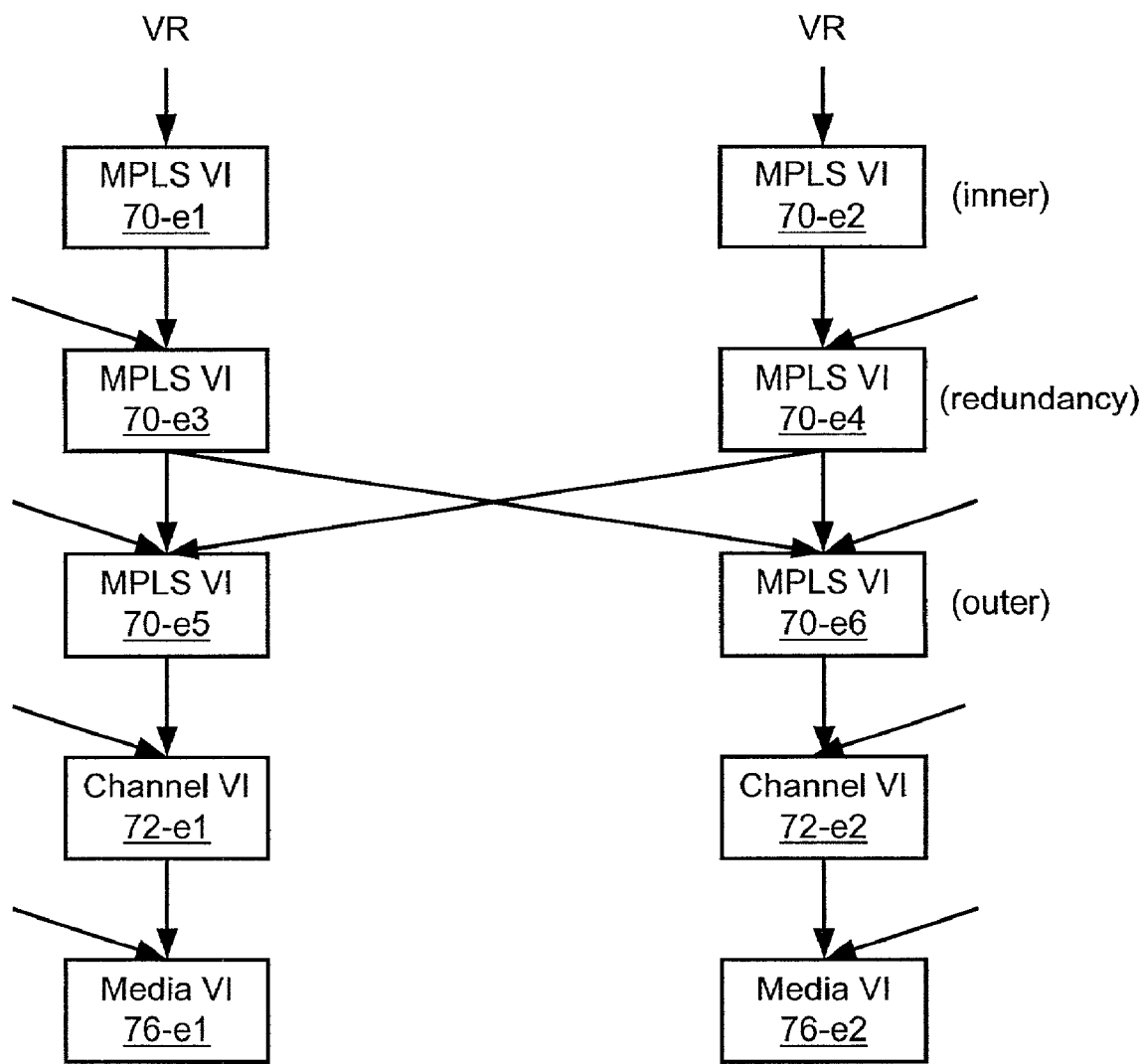

FIG. 11 shows another example that is used to support load balanced MPLS operation. Inner MPLS VIs 70-*e*1 and 70-*e*2 of different VRs point to respective redundant MPLS VIs 70-*e*3 and 70-*e*4, both of which point to the same set of outer MPLS VIs 70-*e*5 and 70-*e*6. The outer MPLS VIs 70-*e*5 and 70-*e*6 point to respective channel VIs 72-*e*1 and 72-*e*2, which in turn point to respective media VIs 76-*e*1 and 76-*e*2. This configuration provides for load balancing when both outer LSPs are operational, and also provides for redundant fail-over when one of the outer LSPs fails.

It will be apparent to those skilled in the art that modifications to and variations of the above-described techniques are possible without departing from the inventive concepts disclosed herein. Accordingly, the invention should be viewed as limited solely by the scope and spirit of the appended claims.

What is claimed is:

1. A network device, comprising:
    a virtual router subsystem including a plurality of virtual routers, each virtual router associated with a corresponding different virtual private routed network (VPRN) and employing generic interface identifiers to identify associated interfaces at which routing traffic for the associated VPRN is received and transmitted;
    a plurality of physical interfaces coupled to physical network links connecting the network device to other network devices; and
    a virtual interface subsystem operative to couple the virtual router subsystem to the physical interfaces, the virtual interface subsystem including a plurality of virtual interfaces, the virtual interfaces being organized into linked sets, each linked set being operative to associate a generic interface identifier of a given virtual router with a corresponding physical interface coupled to a network link connecting the network device to another network device serving the same VPRN, the virtual interfaces included in the virtual interface subsystem include channel virtual interfaces and media virtual interfaces, each channel virtual interface being operative to associate a generic interface identifier of the virtual router subsystem with a virtual channel defined in the network device, and each media virtual interface being operative to associate a virtual channel with a corresponding physical interface and physical channel defined on the associated physical network link, the virtual interfaces included in the virtual interface subsystem further include automatic protection switching virtual interfaces, each automatic protection switching virtual interface being operative to associate a virtual channel with two media virtual interfaces serving as alternative interfaces for sending or receiving routing traffic, the physical network links connected to other network devices include access links and backbone links, and wherein the sets of virtual interfaces include first and second sets, the first set including only a channel virtual interface and a media interface and being associated with an access link, and the second set including a channel virtual interface, an automatic protection switching virtual interface, and a media interface and being associated with a backbone link.

2. A network device according to claim 1, wherein the types of virtual interfaces included in the virtual interface subsystem include label virtual interfaces, each label virtual interface being operative to associate a generic interface identifier of the virtual router subsystem with a label for a label-switched path via which routing traffic can be sent or received.

3. A network device according to claim 2, wherein the label virtual interfaces include label virtual interfaces of a first type associated with inner label-switched paths, and of a second type associated with outer label-switched paths, each outer label switched path logically including multiple inner label-switched paths.

4. A method of operating a network device having a plurality of physical interfaces coupled to corresponding physical network links connecting the network device to other network devices, comprising:

operating a plurality of virtual routers, each virtual router being associated with a corresponding different virtual private routed network (VPRN) and employing generic interface identifiers to identify associated interfaces at which routing traffic for the associated VPRN is received and transmitted;

maintaining a plurality of virtual interfaces, the virtual interfaces being organized into linked sets each operative to associate a generic identifier used by a given virtual router with a corresponding physical interface to another network device serving the same VPRN;

for routing protocol messages transmitted by a given virtual router at a given interface, obtaining physical interface information from the linked set of virtual interfaces associated with the generic interface identifier of the interface, the physical interface information identifying a corresponding physical interface of the network device via which the routing protocol messages are to be transmitted, and transmitting the routing protocol messages on the network link coupled to the identified physical interface, the virtual interfaces include channel virtual interfaces and media virtual interfaces, each channel virtual interface being operative to associate a generic interface identifier of a corresponding virtual router with a virtual channel defined in the network device, and each media virtual interface being operative to associate a virtual channel with a corresponding physical interface and physical channel defined on the associated physical network link, the virtual interfaces further include automatic protection switching virtual interfaces, each automatic protection switching virtual interface being operative to associate a virtual channel with two media virtual interfaces serving as alternative interfaces for sending or receiving routine traffic, the physical network links connected to other network devices include access links and backbone links, and wherein the sets of virtual interfaces include first and second sets, the first set including only a channel virtual interface and a media interface and being associated with an access link, and the second set including a channel virtual interface, an automatic protection switching virtual interface, and a media interface and being associated with a backbone link.

5. A method according to claim 4, wherein the types of virtual interfaces include label virtual interfaces, each label virtual interface being operative to associate a generic interface identifier of a corresponding virtual router with a label for a label-switched path via which routing traffic can be sent or received.

6. A method according to claim 5, wherein the label virtual interfaces include label virtual interfaces of a first type associated with inner label-switched paths, and of a second type associated with outer label-switched paths, each outer label switched path logically including multiple inner label-switched paths.

7. A network device, comprising:

a virtual router subsystem including a plurality of virtual routers, each virtual router associated with a corresponding different virtual private routed network (VPRN) and employing generic interface identifiers to identify associated interfaces at which routing traffic for the associated VPRN is received and transmitted;

a plurality of physical interfaces coupled to physical network links connecting the network device to other network devices; and a virtual interface subsystem operative to couple the virtual router subsystem to the physical interfaces, the virtual interface subsystem including a plurality of virtual interfaces, the virtual interfaces being organized into linked sets, each linked set being operative to associate a generic interface identifier of a given virtual router with a corresponding physical interface coupled to a network link connecting the network device to another network device serving the same VPRN, the virtual interfaces included in the virtual interface subsystem include channel virtual interfaces and media virtual interfaces, each channel virtual interface being operative to associate a generic interface identifier of the virtual router subsystem with a virtual channel defined in the network device, and each media virtual interface being operative to associate a virtual channel with a corresponding physical interface and physical channel defined on the associated physical network link, the channel virtual interfaces are channel virtual interfaces of a first type, and further including channel virtual interfaces of a second type, each second-type virtual interface being operative to associate a label of a label-switched path via which routing traffic can be sent or received with a corresponding virtual channel, and wherein the types of virtual interfaces included in the virtual interface subsystem further include label virtual interfaces, each label virtual interface being operative to associate a generic interface identifier of the virtual router subsystem with a label for such a label-switched path, the physical network links connected to other network devices include access links and backbone links, and wherein the sets of virtual interfaces include first and second sets, the first set including only a channel virtual interface and a media interface and being associated with an access link, and the second set including a label virtual interface, a channel virtual interface, and a media interface and being associated with a backbone link.

8. A network device according to claim 7, wherein the label virtual interfaces are of a first type associated with inner label-switched paths, and wherein the virtual interfaces further include label virtual interfaces of a second type associated with outer label-switched paths, each outer label switched path logically including multiple inner label-switched paths.

9. A network device, comprising:
a virtual router subsystem including a plurality of virtual routers, each virtual router associated with a corresponding different virtual private routed network (VPRN) and employing generic interface identifiers to identify associated interfaces at which routing traffic for the associated VPRN is received and transmitted;
a plurality of physical interfaces coupled to physical network links connecting the network device to other network devices; and
a virtual interface subsystem operative to couple the virtual router subsystem to the physical interfaces, the virtual interface subsystem including a plurality of virtual interfaces, the virtual interfaces being organized into linked sets, each linked set being operative to associate a generic interface identifier of a given virtual router with a corresponding physical interface coupled to a network link connecting the network device to another network device serving the same VPRN, the virtual interfaces included in the virtual interface subsystem include channel virtual interfaces and media virtual interfaces, each channel virtual interface being operative to associate a generic interface identifier of the virtual router subsystem with a virtual channel defined in the network device, and each media virtual interface being operative to associate a virtual channel with a corresponding physical interface and physical channel defined on the associated physical network link, the types of virtual interfaces included in the virtual interface subsystem include channel virtual interfaces, media virtual interfaces, inner label virtual interfaces, and outer label virtual interfaces, each inner label virtual interface being operative to associate a generic interface identifier of the virtual router subsystem with an inner label-switched path via which routing traffic is sent or received, each outer label virtual interface associating multiple inner label-switched paths with an outer label-switched path in which the associated inner label-switched paths are logically included, each channel virtual interface being operative to associate an outer label-switched path with a virtual channel defined in the network device, and each media virtual interface being operative to associate a virtual channel with a corresponding physical interface and physical channel defined on an associated physical network link.

10. A network device according to claim 9, wherein one type of set of linked virtual interfaces includes an inner label virtual interface, an outer label virtual interface, a channel virtual interface, and a media virtual interface.

11. A network device according to claim 9, wherein one type of set of linked virtual interfaces includes an inner label virtual interface, two outer label virtual interfaces, two channel virtual interfaces, and two media virtual interfaces, one of each of the outer label, channel and media virtual interfaces being linked to form a first interface via which routing packets can be sent or received, and the other of each of the outer label, channel and media virtual interfaces being linked to form a second, redundant interface via which routing packets can be sent or received.

12. A network device according to claim 9, wherein one type of set of linked virtual interfaces includes two inner label virtual interfaces, two outer label virtual interfaces, two channel virtual interfaces, and two media virtual interfaces, one of each of the inner label, outer label, channel and media virtual interfaces being linked to form a first interface via which routing packets can be sent or received, and the other of each of the inner label, outer label, channel and media virtual interfaces being linked to form a second, interface via which routing packets can be sent or received, the first and second interfaces serving as both a redundant pair of interfaces and as a load balanced pair of interfaces for routing packets from two distinct virtual routers in the virtual router subsystem.

13. A method of operating a network device having a plurality of physical interfaces coupled to corresponding physical network links connecting the network device to other network devices, comprising:
operating a plurality of virtual routers, each virtual router being associated with a corresponding different virtual private routed network (VPRN) and employing generic interface identifiers to identify associated interfaces at which routing traffic for the associated VPRN is received and transmitted;
maintaining a plurality of virtual interfaces, the virtual interfaces being organized into linked sets each operative to associate a generic identifier used by a given virtual router with a corresponding physical interface to another network device serving the same VPRN;
for routing protocol messages transmitted by a given virtual router at a given interface, obtaining physical interface information from the linked set of virtual interfaces associated with the generic interface identifier of the interface, the physical interface information identifying a corresponding physical interface of the network device via which the routing protocol messages are to be transmitted, and transmitting the routing protocol messages on the network link coupled to the identified physical interface, the virtual interfaces include channel virtual interfaces and media virtual interfaces, each channel virtual interface being operative to associate a generic interface identifier of a corresponding virtual router with a virtual channel defined in the network device, and each media virtual interface being operative to associate a virtual channel with a corresponding physical interface and physical channel defined on the associated physical network link, the channel virtual interfaces are channel virtual interfaces of a first type, and further including channel virtual interfaces of a second type, each second-type virtual interface being operative to associate a label of a label-switched path via which routing traffic can be sent or received with a corresponding virtual channel, and wherein the types of virtual interfaces further include label virtual interfaces, each label virtual interface being operative to associate a generic interface identifier of a corresponding virtual router with a label for such a label-switched path, the physical network links connected to other network devices include access links and backbone links, and wherein the sets of virtual interfaces include first and second sets, the first set including only a channel virtual interface and a media interface and being associated with an access link, and the second set including a label virtual interface, a channel virtual interface, and a media interface and being associated with a backbone link.

14. A method according to claim 13 wherein the label virtual interfaces are of a first type associated with inner label-switched paths, and wherein the virtual interfaces further include label virtual interfaces of a second type associated with outer label-switched paths, each outer label switched path logically including multiple inner label-switched paths.

15. A method of operating a network device having a plurality of physical interfaces coupled to corresponding physical network links connecting the network device to other network devices, comprising:

operating a plurality of virtual routers, each virtual router being associated with a corresponding different virtual private routed network (VPRN) and employing generic interface identifiers to identify associated interfaces at which routing traffic for the associated VPRN is received and transmitted;

maintaining a plurality of virtual interfaces, the virtual interfaces being organized into linked sets each operative to associate a generic identifier used by a given virtual router with a corresponding physical interface to another network device serving the same VPRN;

for routing protocol messages transmitted by a given virtual router at a given interface, obtaining physical interface information from the linked set of virtual interfaces associated with the generic interface identifier of the interface, the physical interface information identifying a corresponding physical interface of the network device via which the routing protocol messages are to be transmitted, and transmitting the routing protocol messages on the network link coupled to the identified physical interface, the virtual interfaces include channel virtual interfaces and media virtual interfaces, each channel virtual interface being operative to associate a generic interface identifier of a corresponding virtual router with a virtual channel defined in the network device, and each media virtual interface being operative to associate a virtual channel with a corresponding physical interface and physical channel defined on the associated physical network link, the types of virtual interfaces include channel virtual interfaces, media virtual interfaces, inner label virtual interfaces, and outer label virtual interfaces, each inner label virtual interface being operative to associate a generic interface identifier of a corresponding virtual router with an inner label-switched path via which routing traffic is sent or received, each outer label virtual interface associating multiple inner label-switched paths with an outer label-switched path in which the associated inner label-switched paths are logically included, each channel virtual interface being operative to associate an outer label-switched path with a virtual channel defined in the network device, and each media virtual interface being operative to associate a virtual channel with a corresponding physical interface and physical channel defined on an associated physical network link.

16. A method according to claim 15 wherein one type of set of linked virtual interfaces includes an inner label virtual interface, an outer label virtual interface, a channel virtual interface, and a media virtual interface.

17. A method according to claim 15 wherein one type of set of linked virtual interfaces includes an inner label virtual interface, two outer label virtual interfaces, two channel virtual interfaces, and two media virtual interfaces, one of each of the outer label, channel and media virtual interfaces being linked to form a first interface via which routing packets can be sent or received, and the other of each of the outer label, channel and media virtual interfaces being linked to form a second, redundant interface via which routing packets can be sent or received.

18. A method according to claim 15 wherein one type of set of linked virtual interfaces includes two inner label virtual interfaces, two outer label virtual interfaces, two channel virtual interfaces, and two media virtual interfaces, one of each of the inner label, outer label, channel and media virtual interfaces being linked to form a first interface via which routing packets can be sent or received, and the other of each of the inner label, outer label, channel and media virtual interfaces being linked to form a second, interface via which routing packets can be sent or received, the first and second interfaces serving as both a redundant pair of interfaces and as a load balanced pair of interfaces for routing packets from two distinct virtual routers.

* * * * *